(12) United States Patent
Takahashi et al.

(10) Patent No.: US 11,607,701 B2
(45) Date of Patent: Mar. 21, 2023

(54) SAMPLE PRETREATMENT DEVICE

(71) Applicant: SHIMADZU CORPORATION, Kyoto (JP)

(72) Inventors: Kazuteru Takahashi, Kyoto (JP); Kenta Terashima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 343 days.

(21) Appl. No.: 16/927,283

(22) Filed: Jul. 13, 2020

(65) Prior Publication Data

US 2021/0078030 A1   Mar. 18, 2021

(30) Foreign Application Priority Data

Sep. 12, 2019 (JP) .............................. JP2019-166069

(51) Int. Cl.
| | |
|---|---|
| *B05B 15/522* | (2018.01) |
| *G01N 1/31* | (2006.01) |
| *B05B 15/555* | (2018.01) |
| *G01N 35/10* | (2006.01) |
| *H01J 49/04* | (2006.01) |
| *H01J 49/16* | (2006.01) |

(52) U.S. Cl.
CPC ........ *B05B 15/5223* (2018.02); *B05B 15/555* (2018.02); *G01N 1/31* (2013.01); *G01N 35/1004* (2013.01); *G01N 2001/317* (2013.01); *H01J 49/0418* (2013.01); *H01J 49/0445* (2013.01); *H01J 49/164* (2013.01); *H01J 49/165* (2013.01)

(58) Field of Classification Search
CPC .... B05B 15/5223; B05B 15/555; G01N 1/31; G01N 35/1004; G01N 2001/317; H01J 49/0418; H01J 49/0445; H01J 49/164; H01J 49/165
See application file for complete search history.

(56) References Cited

FOREIGN PATENT DOCUMENTS

| JP | 58-74165 A | 5/1983 |
| JP | 6-154673 A | 6/1994 |
| JP | 2004-179079 A | 6/2004 |
| WO | 2019/106799 A1 | 6/2019 |

OTHER PUBLICATIONS

"HTX M5 Sprayer™ Features Overview", HTX Technologies, LLC., 2018, 3 pgs.
Notice of Reasons for Refusal dated Oct. 25, 2022 from the Japanese Patent Office in Japanese Application No. 2019-166069.
Decision of Refusal dated Feb. 7, 2023 from the Japanese Patent Office in Japanese Application No. 2019-166069.

*Primary Examiner* — Nicole M Ippolito
*Assistant Examiner* — Hanway Chang
(74) *Attorney, Agent, or Firm* — Sughrue Mion, PLLC

(57) ABSTRACT

Provided is a sample pretreatment device configured to apply, to the surface of a sample, a solution in which a predetermined substance is dissolved or dispersed. In order to properly and efficiently unclog a nozzle due to the deposition of the crystal of a matrix substance, the device includes a spray unit (3) including a solution tube (32) for the solution to pass through, a gas tube (33) for a spray gas to pass through, and a nozzle part (30) configured to spray the solution arriving at the terminal end of the solution tube by ejection of the spray gas through the gas tube, as well as a cleaning liquid supplier (4, 41) configured to put a cleaning liquid on an opening of the nozzle part from outside the spray unit.

11 Claims, 5 Drawing Sheets

SAMPLE PRETREATMENT DEVICE

TECHNICAL FIELD

The present invention relates to a sample pretreatment device used for performing a pretreatment for an analysis of a sample by applying a predetermined solution to the sample surface or forming a film of a predetermined substance on the sample surface.

BACKGROUND ART

In recent years, imaging mass spectrometers which employ matrix assisted laser desorption ionization (MALDI) as an ionization method have been developed. An imaging mass spectrometer allows for an investigation of the distribution of a substance having a specific mass, based on the result of a mass spectrometric analysis performed at each of the measurement points within a two-dimensional area on a sample, such as a biological tissue section.

In order to perform a mass spectrometric analysis on a sample using such a device, a sample pretreatment for thinly applying a matrix for MALDI (which is hereinafter simply called the "matrix") to the surface of the sample must be performed before the analysis. The most commonly used method for apply a matrix layer to a sample having a considerably large area is the matrix-solution spray method using an air brush (this method is hereinafter simply called the "spray method"). For example, Non Patent Literature 1 discloses an automatic matrix spray device configured to automatically apply a matrix by the spray method.

FIG. 6 is a schematic configuration diagram of the main components of a spray device disclosed in Patent Literature 1. The device includes a sample stage 21 and a spray unit 3. A sample 100 is attached to the sample stage 21. The sample stage 21 is movable in both the X-axis and Y-axis directions as shown in FIG. 6. The spray unit 3 includes a gas tube 33 for a spray gas to pass through, a solution tube 32 for a matrix solution to pass through, and a nozzle 30 with its tip portion tapering off in a substantially conic form. The two tubes inside the nozzle 30 form a double-tube structure in which the solution tube 32 is surrounded by the gas tube 33, with both tubes 32 and 33 having an opening at their respective terminal ends. A needle 31 is inserted at the center of the solution tube 32, which is also the center of the nozzle 30. The tip of the needle 31 slightly protrudes from the opening 321 at the terminal end of the solution tube 32 on the Z axis. A cover 34 covers the entire nozzle 30. The cover 34 has a spray port 341 of a predetermined size formed in front of the tip of the needle 31.

In the process of applying a matrix solution to the surface of the sample 100, the matrix solution is supplied to the solution tube 32 to fill the tube, while a flow of gas whose pressure is high to a certain extent is supplied to the gas tube 33. Then, a high-pressure spray gas is powerfully ejected from the opening at the tip of the gas tube 33 in the nozzle 30, whereby the pressure around the opening 321 at the tip of the solution tube 32 is reduced due to the Venturi effect. The matrix solution in the solution tube 32 is thereby extracted from the opening 321 to the outside, flowing along the needle 31. The extracted matrix solution is torn into micro-sized droplets by the strong flow of the spray gas. The droplets are carried by the flow of the spray gas and ejected from the spray port 341 in the Z-axis direction (rightward in FIG. 6). The matrix solution sprayed from the spray unit 3 in this manner adheres to the surface of the sample 100 on the sample stage 21. By appropriately changing the position of the sample stage 21 in the X-Y plane, a thin layer of matrix solution can be formed over a large area on the sample 100.

Although the needle 31 is dispensable, the use of the needle 31 is effective for the atomization of the matrix solution since it allows the solution to flow along the needle 31 and thereby improves the tearing efficiency of the matrix solution.

CITATION LIST

Patent Literature

Patent Literature 1: WO 2019/106799 A1

Non Patent Literature

Non Patent Literature 1: "HTX M5 Sprayer™ Features Overview", [online], HTX Technologies, LLC., [accessed on Aug. 21, 2019], the Internet

SUMMARY OF INVENTION

Technical Problem

In order to apply the matrix solution over the entire sample surface and with a uniform thickness in the previously described spray device, it is preferable to maximally decrease the size of the sprayed droplets. In order to decrease the size of the sprayed droplets, the gap between the edge of the opening 321 at the terminal end of the solution tube 32 and the needle 31 is made to be considerably small. Additionally, the drying of the matrix solution at the tip portion of the nozzle 30 is promoted by the flow of the spray gas. Therefore, a lump of the crystal of the matrix substance is easily formed at or near the tip of the nozzle 30, causing the nozzle 30 to be easily clogged.

To address this problem, the spray device described in Patent Literature 1 is configured to apply pressure to the matrix solution when supplying the solution to the solution tube 32. According to this configuration, the formation of the crystal of the matrix substance at the tip portion of the nozzle 30 is directly suppressed by supplying a pressurized flow of the matrix solution to the solution tube 32 in the process of spraying the matrix solution. Another anticipated effect is the dissolution of the crystal of the matrix substance formed at the tip portion of the nozzle 30. This effect can be achieved by supplying the pressurized flow of the matrix solution to the solution tube 32 without the supply of the spray gas so that the flow of the matrix solution hits the crystal of the matrix substance within a period of time where the matrix solution is not being sprayed.

Consider the situation in which the gap between the edge of the opening 321 at the tip of the solution tube 32 and the needle 31 is clogged by the crystal of the matrix substance. In some cases, the crystal can be dissolved and removed by the effect of the pressurized flow of the matrix solution. However, depending on the extent of the clogging by the crystal, it is often impossible to remove the crystal since the matrix solution in which the matrix solution has already been dissolved is insufficiently effective in dissolving the already crystalized matrix substance. Furthermore, it is even more difficult to remove the lump of the crystal of the matrix solution if the lump is formed in such a location as an area surrounding the needle 31 outside the opening 321 or the gap between the needle 31 and the spray port 341, since it is difficult for the pressurized matrix solution to reach such a location.

As another method, an organic solvent may be supplied to the solution tube 32 in place of the matrix solution to dissolve the crystallized matrix substance. However, if the opening 321 is closed by a lump of crystal, the solvent cannot be sufficiently supplied to the area outside the opening 321, so that the effect of dissolving the crystal located outside the opening 321 cannot be satisfactorily obtained. Additionally, since the organic solvent for the cleaning must be passed through the solution tube 32 in place of the matrix solution, a considerable amount of time is required for the switching of the supplied liquid. Therefore, an attempt to unclog the nozzle in the middle of the process of spraying the matrix solution will dramatically increase the operation time.

Such a problem is not limited to the case where a matrix solution is applied to a sample surface. A similar problem can also occur in other cases, such as the case of spraying a digestive enzyme on a sample for such purposes as an analysis of a peptide in a biological sample, or the case of spraying various kinds of derivatization reagents such as a fluorescence reagent, or spraying other types of reagents.

The present invention has been developed to solve the previously described problem. Its objective is to provide a sample pretreatment device capable of unclogging the nozzle by properly and efficiently removing the crystal of a matrix substance or similar substance formed at the tip portion of the nozzle.

Solution to Problem

A sample pretreatment device according to one mode of the present invention developed for solving the previously described problem is a sample pretreatment device configured to apply, to the surface of a sample, a solution in which a predetermined substance is dissolved or dispersed, including:

a spray unit including a solution tube for the solution to pass through, a gas tube for a spray gas to pass through, and a nozzle part configured to spray the solution arriving at the terminal end of the solution tube by ejection of the spray gas through the gas tube; and a cleaning liquid supplier configured to put a cleaning liquid on an opening of the nozzle part from outside the spray unit.

As one example, the predetermined solution may be a solution containing a matrix substance for MALDI. A typical example of the cleaning liquid is an organic solvent, which is normally the solvent used for the predetermined solution.

The location "outside the spray unit" may be a location in front of the spray unit (on the front side in the spraying direction), above the spray unit, below the spray unit, or on a side of the spray unit.

Advantageous Effects of Invention

In the sample pretreatment device according to the previously described mode of the present invention, the cleaning liquid supplier puts a cleaning liquid on an area outside the opening of the nozzle part from which a predetermined solution (e.g. a matrix solution) is sprayed. As compared to the solution sprayed from the nozzle part, the cleaning liquid is more capable of dissolving the substance in the solution. Furthermore, although this depends on the form or position of the lump of crystal, the cleaning liquid is likely to have a large contact area with the lump of crystal since the cleaning liquid is put from a location in front of the spray unit. The cleaning liquid which has come in contact with the lump of crystal and dissolved the crystallized substance flows downward, followed by a continuous supply of the cleaning liquid which is fresh and extremely capable of dissolving the substance.

Accordingly, as compared to a conventional device, the sample pretreatment device according to the previously described mode of the present invention can more assuredly and more efficiently remove the lump of crystal formed at the tip of the nozzle part and unclog the nozzle part. In particular, the lump of crystal formed on an area outside the opening of the nozzle part can be efficiently dissolved and removed. This reduces the amount of change in the flow rate of the solution due to the clogging of the nozzle part and thereby allows the solution to be sprayed in a stable form. Consequently, for example, the matrix can be applied with a high degree of uniformity which leads to a high level of analysis reproducibility. Furthermore, since the cleaning liquid is supplied to the tip of the nozzle part via a channel independent of the solution tube, the unclogging of the nozzle part can be achieved with a minimal influence on the spraying operation.

DESCRIPTION OF EMBODIMENTS

An embodiment of the sample pretreatment device according to the present invention is hereinafter described with reference to the attached drawing.

Configuration of Device According to Present Embodiment

Figure 1:
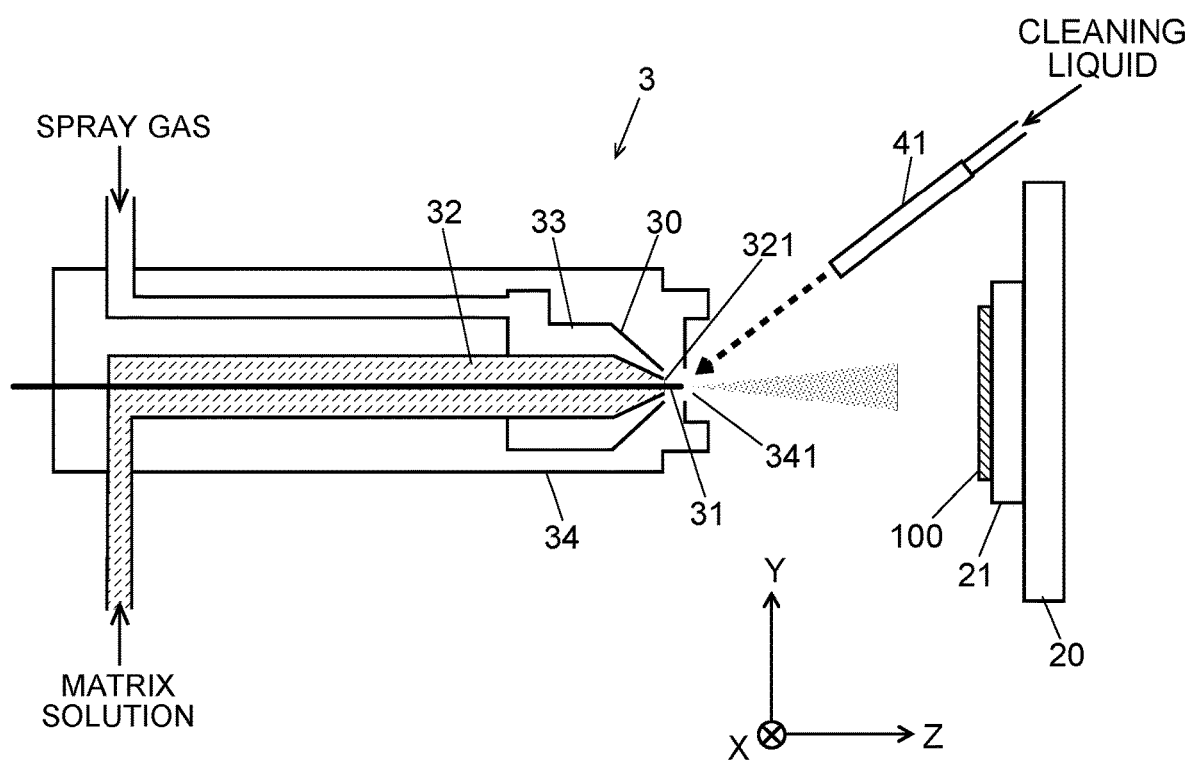
FIG. 1 is a schematic configuration diagram of the spray unit of a matrix spray device as one embodiment of the present invention.
Figure 2:
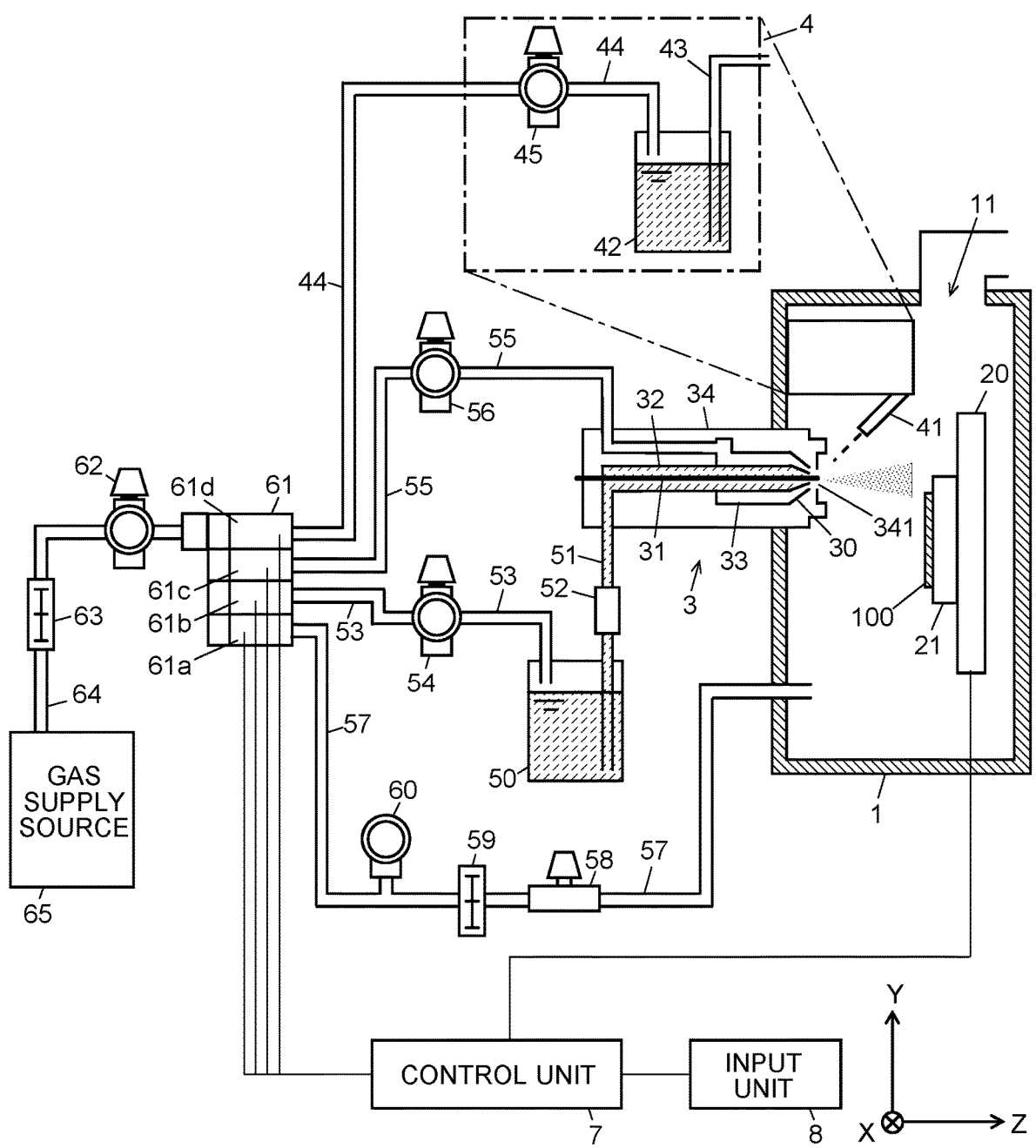
FIG. 2 is a schematic diagram showing the overall configuration of the matrix spray device according to the present embodiment.
Figure 6:
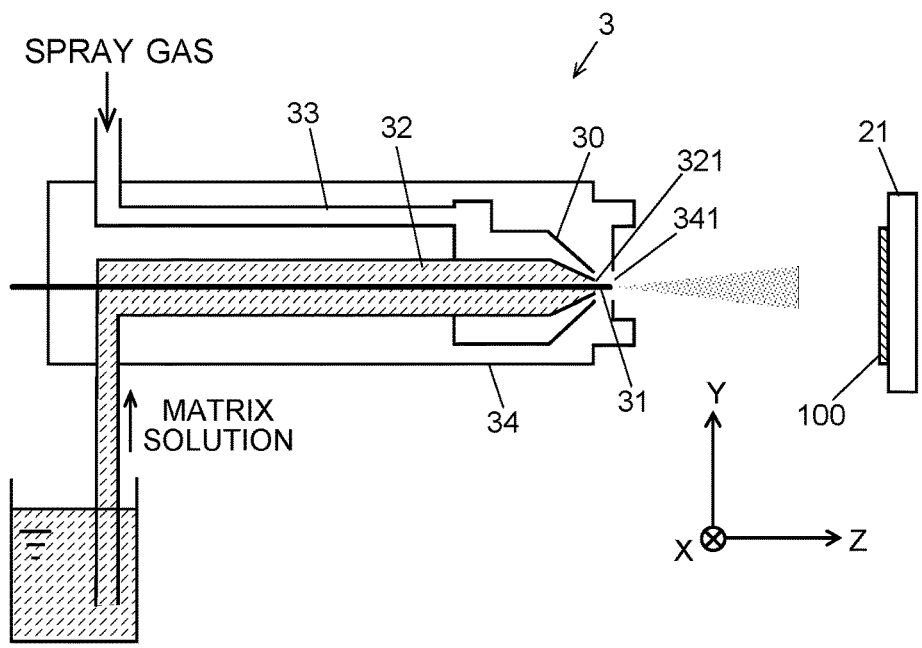
FIG. 6 is a schematic configuration diagram of the main components of a conventional spray device.

FIG. 2 is a schematic diagram showing the overall configuration of the matrix spray device according to the present embodiment. FIG. 1 is a schematic configuration diagram of the spray unit in FIG. 2. The components identical to the already described components shown in FIG. 6 are denoted by the same reference signs.

As shown in FIG. 2, the matrix spray device according to the present embodiment includes a chamber 1 in which a sample 100 is to be contained, a spray unit 3 for spraying a matrix solution on the surface of the sample 100, and a cleaning unit 4 for cleaning the tip portion of the nozzle 30 in the spray unit 3.

More specifically, the chamber 1 contains a sample stage 21 to which a sample 100 is to be attached, an XY-moving mechanism 20 configured to change the position of the sample stage 21 in the X-Y plane, and the cleaning unit 4 including a cleaning-liquid ejection nozzle 41. The spray unit 3 is fixed in the wall surface of the chamber 1 on the side opposite to the sample stage 21. An exhaust opening 11 is formed in one of the wall surfaces of the chamber 1 (in the case of FIG. 2, the top surface). The exhaust opening 11 is connected to a draft chamber (not shown).

The spray unit 3 includes a nozzle 30 with its tip portion tapering off in a substantially conic form and a cover 34 which covers the entire nozzle 30. The nozzle 30 internally has a double-tube structure including a solution tube 32 and a gas tube 33 which is coaxial with the solution tube 32 and arranged so as to serve as an outer cylinder surrounding the solution tube 32. The solution tube 32 has an opening 321 formed at its terminal end. A needle 31 for guiding the solution in the spraying operation is inserted at the center of the opening 321. The openings at the tip of the gas tube 33 and that of the solution tube 32 are located at approximately the same position on the Z axis, whereas the tip of the needle 31 slightly protrudes from the opening 321. The amount of protrusion of the tip of the needle 31 can be adjusted as needed. The size of the sprayed droplets depends on the amount of protrusion.

The solution tube 32 in the spray unit 3 has a base end, to which one end of a solution supply tube 51 is connected. The other end of the solution supply tube 51 is inserted into a closed solution container 50 holding a matrix solution, and is immersed in this solution (to a level lower than the solution surface in the solution container 50; this level is normally close to the bottom of the container 50). A resistance tube 52 is provided in the middle of the solution supply tube 51. As the resistance tube 52, a tube having a sufficiently large passage resistance as compared to the passage resistance at the top portion of the solution tube 32 in the nozzle 30 may be used, such as a capillary tube having an appropriate inner diameter and length.

The gas tube 33 in the spray unit 3 has a base end, to which one end of a spraying-gas pipe 55 is connected. The other end of the spraying-gas pipe 55 is connected to a gas supply source 65 via a manifold (multiple-branching tube) 61 and common pipe 64. The gas supply source 65, which is a gas cylinder, gas generator or the like, sends inert gas (e.g. nitrogen gas) whose pressure is higher than atmospheric pressure to the common pipe 64. The manifold 61 has one inlet end and four outlet ends. The common pipe 64 is connected to the single inlet end, while the spraying-gas pipe 55 is connected to one of the four outlet ends. One end of a replacing-gas pipe 57 is connected to one of the three other outlet ends. One end of a first pressurizing-gas pipe 53 is connected to another one of the outlet ends. One end of a second pressurizing-gas pipe 44 is connected to the last remaining outlet end.

The other end of the replacing-gas pipe 57 is open to the inner space of the chamber 1, while the other end of the first pressurizing-gas pipe 53 is open to the upper space in the solution container 50 (i.e. the space above the solution surface in the solution container 50). The other end of the second pressurizing-gas pipe 44 is open to the upper space in a cleaning-liquid container 42 (i.e. the space above the solution surface in the cleaning-liquid container 42) which is a component of the cleaning unit 4. Each of the four outlet ends of the manifold 61 is equipped with a solenoid valve. In the following description, the valve provided at the outlet end to which the replacing-gas pipe 57 is connected is called the gas-replacing valve 61a, the valve provided at the outlet end to which the first pressurizing-gas pipe 53 is connected is called the first pressurizing valve 61b, the valve provided at the outlet end to which the spraying-gas pipe 55 is connected is called the spraying valve 61c, and the value provided at the outlet end to which the second pressurizing-gas pipe 44 is connected is called the second pressurizing valve 61d.

The spraying-gas pipe 55, first pressurizing-gas pipe 53 and second pressurizing-gas pipe 44 are provided with manual pressure control valves 56, 54 and 45, respectively. The common pipe 64 is provided with a flowmeter 63 and manual pressure control valve 62. The replacing-gas pipe 57 is provided with a pressure gauge 60, flowmeter 59 and manual pressure control valve 58.

In addition to the previously described second pressurizing pipe 44, cleaning-liquid container 42 and cleaning-liquid ejection nozzle 41, the cleaning unit 4 includes a cleaning-liquid supply tube 43 having one end immersed in the cleaning liquid stored in the cleaning-liquid container 42. The cleaning-liquid ejection nozzle 41 is connected to the other end of the cleaning-liquid supply tube 43, with its outlet end directed to the spray port 341 of the spray unit 3, i.e. the tip portion of the needle 31 within the chamber 1. The cleaning liquid is the solvent used for the matrix solution.

The matrix spray device according to the present embodiment further includes a control unit 7 which is an electrical circuit for controlling the operations of the XY-moving mechanism 20 and the solenoid valves 61a-61d, as well as an input unit 8 configured to allow a user to input various settings and instructions. For example, the control unit 7 may include a multipurpose personal computer as a hardware resource, on which various functions (which will be described later) are performed by executing, on the computer, dedicated software (computer program) installed on the same computer. Understandably, the control unit 7 can also be configured on a microcomputer, digital signal processor or similar device.

Matrix-Applying Operation in Device According to Present Embodiment

An operation performed by the device when applying a matrix solution to the surface of the sample 100 in the matrix spray device according to the present embodiment is hereinafter schematically described. For example, the sample 100 is a sample plate on which a biological tissue section or similar specimen to be subjected to imaging mass spectrometry is attached.

The user (operator) attaches the sample 100 to be pretreated to the sample stage 21, and closes the door (not shown) of the chamber 1. Subsequently, the user manually adjusts the opening of each of the pressure control valves 62, 54 and 56 as needed, and then operates the input unit 8 to instruct the device to initiate the task.

Upon receiving this instruction, the control unit 7 initially sends a control signal to the gas-replacing valve 61a to open this valve 61a. This allows the inert gas supplied from the gas supply source 65 to flow through the manifold 61 and the replacing-gas pipe 57 into the chamber 1. The air within the chamber 1 is replaced by the inert gas.

After the passage of a predetermined period of time which is sufficient for the inert gas to replace the air within the chamber 1, the control unit 7 sends a control signal to the first pressurizing valve 61b to open this valve 61b. This allows the inert gas supplied from the gas supply source 65 to the manifold 61 to additionally flow into the first pressurizing-gas pipe 53. Then, the inert gas is introduced from the terminal end of the first pressurizing-gas pipe 53 into the upper space in the solution container 50. This gas applies pressure on the liquid surface of the matrix solution in the solution container 50. Consequently, the matrix solution is introduced into the solution supply tube 51 and passes through the resistance tube 52, to be ejected from the opening 321 of the solution tube 32 in the spray unit 3.

Figure 3:
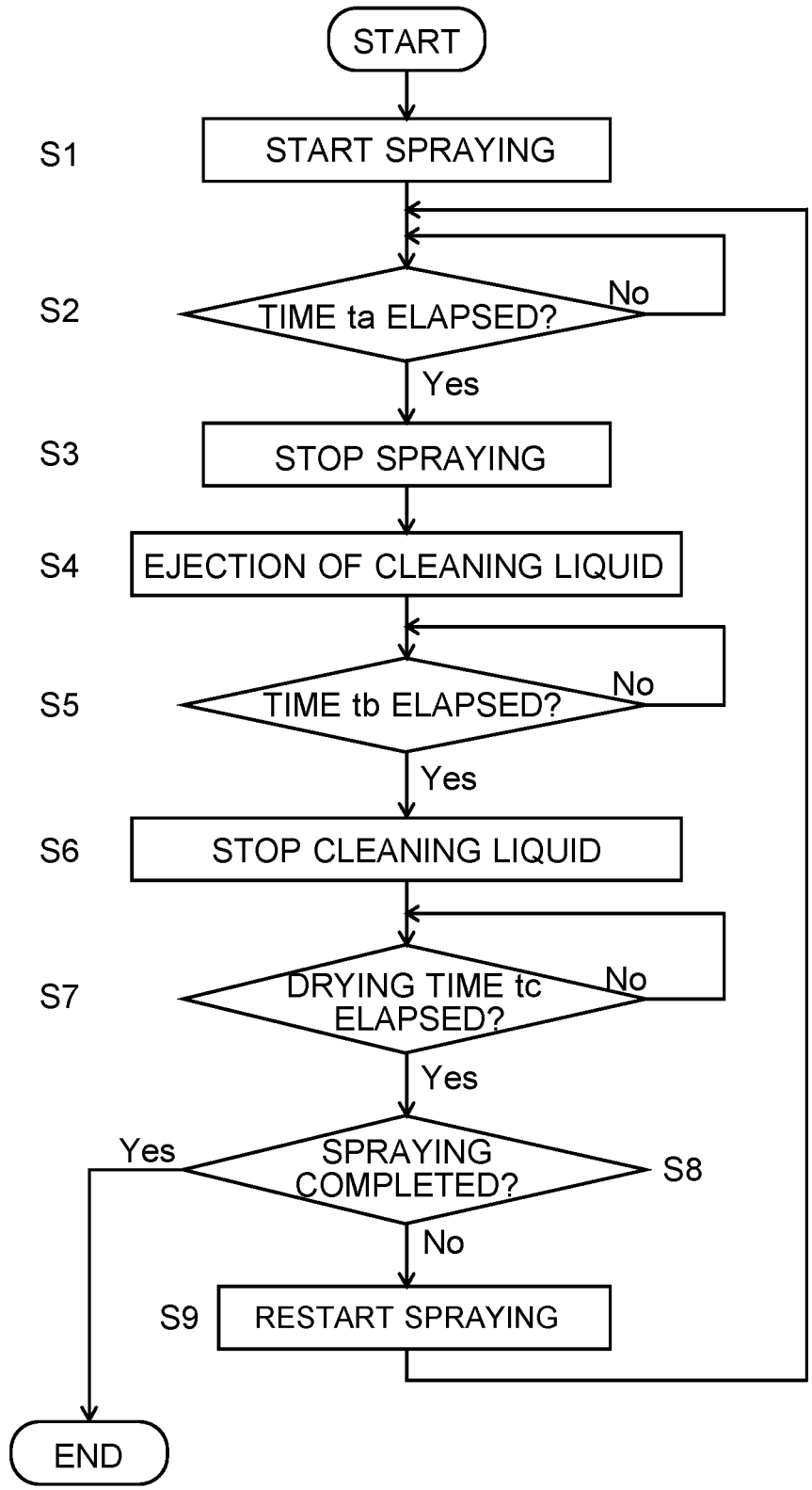
FIG. 3 is a flowchart of one example of the matrix-applying operation in the matrix spray device according to the present embodiment.

Meanwhile, the control unit 7 also sends a control signal to the spraying valve 61*c* to open this valve 61*c*. This allows the inert gas supplied from the gas supply source 65 to the manifold 61 to flow into the spraying-gas pipe 55. Consequently, the inert gas is powerfully ejected from the opening at the tip of the gas tube 33 in the spray unit 3. As described earlier, the matrix solution exiting from the opening 321 at the tip of the solution tube 32 is torn into micro-sized droplets by the ejected inert gas. The droplets are mixed in the gas and ejected from the tip of the nozzle 30, forming a gradually spreading stream passing through the spray port 341 and directed toward the sample 100.

After the spraying of the matrix solution is initiated in the previously described manner, the control unit 7 sends control signals to the XY-moving mechanism 20. According to the control signals, the mechanism 20 changes the position of the sample stage 21 in the X-Y plane so that the matrix solution is uniformly sprayed on the entire surface of the sample 100.

As described to this point, the matrix spray device according to the present embodiment can uniformly apply the matrix solution over the entire surface of the sample 100. As described earlier, the present device is configured to supply a pressurized flow of the matrix solution to the solution tube 32 in the nozzle 30. Therefore, the matrix solution is unlikely to stay at or near the tip of the solution tube 32. Accordingly, the nozzle 30 becomes less likely to be clogged due to the formation of the lump of the crystal of the matrix substance.

Nozzle-Cleaning Operation in Device According to Present Embodiment

However, since the matrix solution exiting from the opening 321 of the solution tube 32 flows along the needle 31, a lump of the crystal of the matrix substance is easily formed near the tip of the needle 31 outside the opening 321. Such a lump of crystal cannot be easily dissolved and removed even by the pressurized supply of the matrix solution to the solution tube 32. To address this problem, the matrix spray device according to the present embodiment is equipped with the cleaning unit 4 including the cleaning-liquid ejection nozzle 41 so as to eject a cleaning liquid toward the tip portion of the nozzle 30 from the front side (to be exact, from obliquely above on the front side) in the spraying direction of the solution from the spray unit 3.

In the present embodiment, the cleaning-liquid ejection nozzle 41 is located in front of the spray unit 3 so as to put the cleaning liquid on the nozzle 30 through the spray port 341 formed in the cover 34 which covers the nozzle 30. The position of the cleaning-liquid ejection nozzle 41 is not limited to this location. For example, if there is no cover 34, the cleaning-liquid ejection nozzle 41 may be located at a position above, below or on a side of the spray unit 3. That is to say, the cleaning-liquid ejection nozzle 41 may be located at any position as long as the cleaning liquid can be put on the tip portion of the nozzle 30 from outside the spray unit 3.

The cleaning-liquid container 42, cleaning-liquid supply tube 43, second pressurizing-gas pipe 44 and pressure control valve 45 in the cleaning unit 4 have basically the same configuration as the solution container 50, solution supply tube 51, first pressurizing-gas pipe 53 and pressure control valve 54 for producing a pressurized flow of the matrix solution. In other words, for the cleaning of the tip portion of the nozzle 30 (to remove the lump of matrix crystal), the control unit 7 sends a control signal to the second pressurizing valve 61*d* to open this valve 61*d*. This allows the inert gas supplied from the gas supply source 65 to the manifold 61 to flow into the second pressurizing-gas pipe 44. Then, the inert gas is introduced from the terminal end of the second pressurizing-gas pipe 44 into the upper space in the cleaning-liquid container 42. This gas applies pressure on the liquid surface of the cleaning liquid in the cleaning-liquid container 42. Consequently, the cleaning liquid is introduced into the cleaning-liquid supply tube 43, to be ejected from the cleaning-liquid ejection nozzle 41 attached to the terminal end of the cleaning-liquid supply tube 43, as indicated by the arrowed dash line in FIG. 1.

The ejected cleaning liquid passes through the spray port 341 and directly hits the tip portion of the needle 31, i.e. the lump of the deposited matrix crystal. The cleaning liquid also hits the exit ports of the solution tube 32 and the gas tube 33. Since the cleaning liquid is the solvent used for the matrix solution and yet contains no matrix substance, the liquid is highly capable of dissolving the matrix substance. The cleaning liquid which has dissolved the matrix substance (i.e. in which the matrix substance is dissolved) immediately flows downward, after which a fresh supply of cleaning liquid having high dissolving power continuously hits the lump of matrix crystal. The lump of matrix crystal deposited on the needle 31 in an area outside the opening 321 normally has a comparatively large contact area with the cleaning liquid. Therefore, the lump of matrix crystal can be dissolved and removed from the tip portion of the needle 21 within a comparatively short period of time. The cleaning liquid having high dissolving power also hits the matrix crystal formed at the terminal-end portion of the solution tube 32. Therefore, the crystal at such a location will also be dissolved and removed.

[Nozzle-Cleaning Operation in Matrix-Applying Work]

The process of cleaning the tip portion of the nozzle 30 by ejecting the cleaning liquid from the cleaning-liquid ejection nozzle 41 may be performed while the spraying of the matrix solution is being performed. However, the drop of the solution or flow of the spray gas may possibly prevent the cleaning liquid from hitting the tip portion of the needle 31 or other related areas, thereby lowering the cleaning efficiency. Therefore, it is preferable to temporarily discontinue the spraying of the matrix solution when ejecting the cleaning liquid from the cleaning-liquid ejection nozzle 41.

Under normal conditions, the process of applying the matrix to the surface of the sample by the spray method includes repetitively performing a spraying process in which the matrix solution is sprayed on the entire surface of the sample and a drying process in which the matrix solution adhered to the sample surface is dried. During the latter drying process, the spraying of the matrix solution from the spray unit 3 is temporarily discontinued. Therefore, the cleaning of the nozzle 30 can be performed at this timing. Accordingly, the matrix spray device according to the present embodiment is configured to regularly perform the nozzle cleaning during the matrix-applying operation, as will be hereinafter described.

FIG. 3 is a flowchart of one example of the matrix-applying operation in the matrix spray device according to the present embodiment.

The control unit 7 opens both the first pressurizing valve 61b and the spraying valve 61c to initiate the spraying of the matrix solution from the spray unit 3 in the previously described manner (Step S1). After the spraying is initiated, the control unit 7 activates the XY-moving mechanism 20 to appropriately change the position of the sample stage 21 in the X-Y plane so that the site which receives the spray of the matrix solution on the sample 100 is sequentially moved. After the passage of the period of time to required for the matrix solution to be sprayed over the entire surface of the sample 100 ("Yes" in Step S2), the control unit 7 temporarily closes the first pressurizing valve 61b and the spraying valve 61c to discontinue the spraying of the matrix solution (Step S3).

The control unit 7 subsequently opens the second pressurizing valve 61d to put the cleaning liquid ejected from the cleaning-liquid ejection nozzle 41 on the tip portion of the nozzle 30 (Step S4). The cleaning is continued until a predetermined length of cleaning-liquid supply time tb is elapsed. After the cleaning-liquid supply time tb is elapsed ("Yes" in Step S5), the control unit 7 closes the second pressurizing valve 61d to discontinue the cleaning (Step S6).

The control unit 7 further waits for the elapse of a predetermined drying time tc for drying the matrix solution previously sprayed on the sample 100. After the drying time tc is elapsed ("Yes" in Step S7), the control unit 7 determines whether or not the previously determined operation of spraying the matrix solution has been completed (Step S8). For example, in the case where the spraying process and the drying process should be repeated a predetermined number of times in the previously described manner, the control unit 7 can determine whether or not the repetitive process has been performed the predetermined number of times. If the determination result in Step S8 is "Yes", the pretreatment operation for the sample 100 is completed. If the determination result in Step S8 is "No", the spraying of the matrix solution similar to Step S1 is (once more) initiated (Step S9), and the control returns to Step S2.

In the previously described processing, the period of time for drying the matrix solution sprayed on the sample 100 can be used for the removal of the matrix crystal deposited at the tip of the nozzle 30. The cleaning of the tip portion of the sample 100 may be automatically performed every time the matrix solution is sprayed on the sample 100 for the predetermined period of time. Accordingly, the clogging of the nozzle 30 in the middle of the task of spraying the matrix solution can be prevented, while the task of applying the matrix can be efficiently performed since the spraying of the matrix solution does not need to be discontinued in order to especially secure a period of time for the cleaning of the tip portion of the nozzle 30. The periods of time ta, tb and tc can be appropriately determined depending on the size of the sample 100, kind and concentration of the matrix as well as various other factors.

The period of time required for the spraying of the matrix solution over the entire surface of the sample 100 depends on the size of the sample 100. If the period of time is considerably long, the nozzle 30 may possibly begin to be clogged before the completion of the spraying of the matrix solution over the entire surface of the sample 100, or the clogging may possibly develop to such an extent that the clogging substance cannot be easily removed. When such a situation is likely to occur, the spraying of the matrix solution on the surface of the sample 100 may be temporarily discontinued to perform the operation of putting the cleaning liquid on the nozzle 30 for a predetermined period of time. Thus, the operation of cleaning the nozzle 30 by the cleaning unit 4 can be performed at an appropriate point in time even before the spraying of the matrix solution over the entire surface of the sample 100 is completed.

It is preferable to configure the device to allow users to program the previously described sequence of operations through the input unit 8, with the control unit 7 configured to control the related sections according to that program.

Modified Example

In the matrix spray device according to the previous embodiment, the cleaning of the nozzle 30 is performed in the middle of the matrix-applying operation regardless of whether or not the nozzle 30 is clogged. Additionally, in some cases, the nozzle 30 may be completely clogged before the cleaning is performed. In view of these factors, the configuration and operation of the device can be modified as follows so that the cleaning of the nozzle 30 is performed when the clogging of the nozzle 30 has actually occurred or is most likely to occur.

Figure 4:
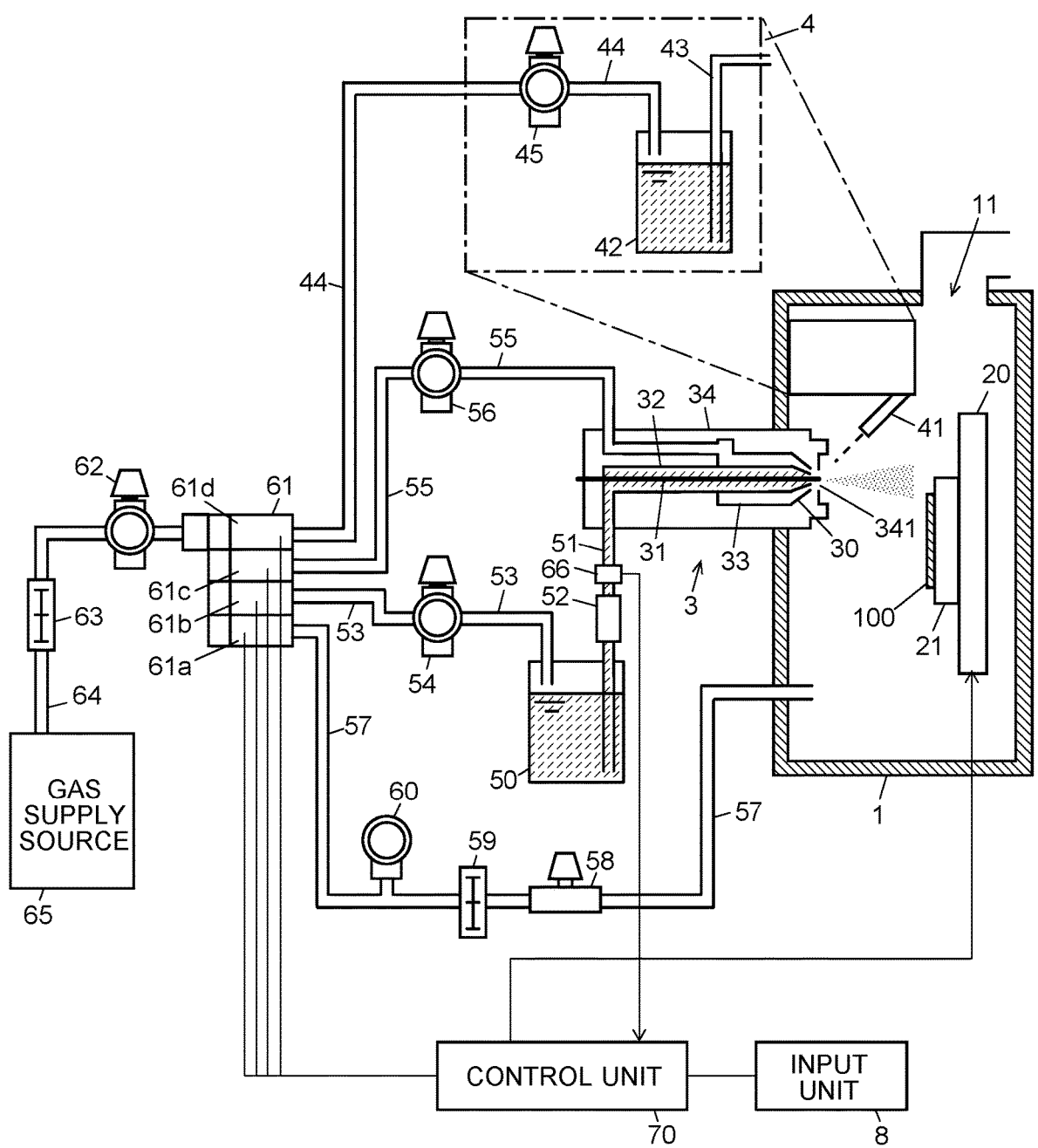
FIG. 4 is a schematic diagram showing the overall configuration of a matrix spray device which is a modified example.

FIG. 4 is a schematic diagram showing the overall configuration of a matrix spray device which is a modified example. This device has basically the same configuration as the device shown in FIG. 2. The same components as shown in FIG. 2 are denoted by the same reference signs. A difference from the device shown in FIG. 2 exists in that a flow sensor 66 is provided in the liquid supply tube 51 which supplies the matrix solution to the solution tube 32 in the spray unit 3, and the flow-rate value detected by the flow sensor 66 is sent to the control unit 70. This control unit 70 performs a control different from the control performed by the control unit 7 in the device shown in FIG. 2.

Figure 5:
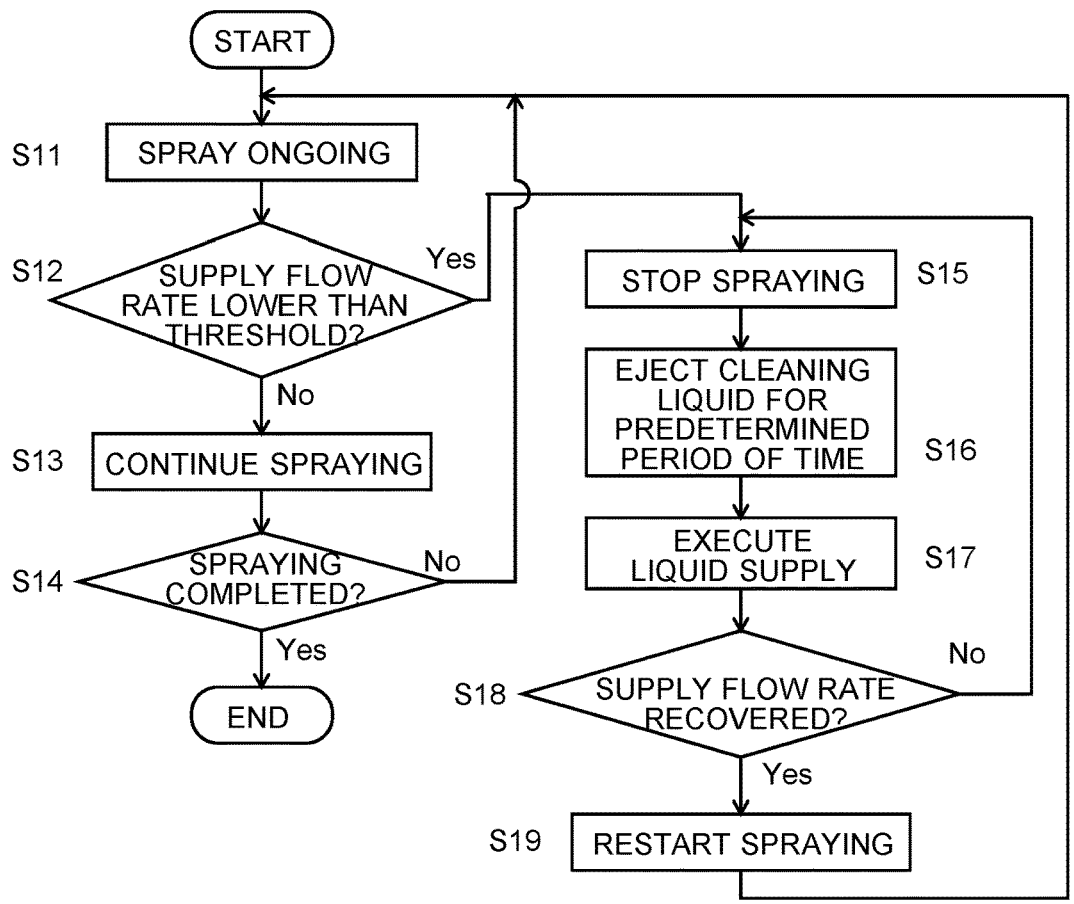
FIG. 5 is a flowchart of one example of the matrix-applying operation in the matrix spray device which is the modified example.

FIG. 5 is a flowchart of one example of the matrix-applying operation in the matrix spray device according to the modified example shown in FIG. 4.

While the process of spraying the matrix solution from the spray unit 3 is being performed (Step S11), the control unit 70 refers to the value detected by the flow sensor 66 and determines whether or not the supply flow rate at the moment is equal to or lower than a predetermined threshold (Step S12). If the determination result in Step S12 is "No", it is possible to conclude that the nozzle 30 is not clogged or shows no sign of clogging, so that the spraying of the matrix solution is further continued (Step S13). Subsequently, the control unit 70 determines whether or not the spraying operation has been completed (Step S14). If the spraying operation has not been completed, the control returns to Step S11.

If the supply flow rate of the matrix solution is so low that the determination result in Step S12 is "Yes", the control unit 70 temporarily closes the first pressurizing valve 61b and the spraying valve 61c to discontinue the spraying of the matrix solution (Step S15). The control unit 70 subsequently opens the second pressurizing valve 61d to put the cleaning liquid ejected from the cleaning-liquid ejection nozzle 41 on the tip portion of the nozzle 30. This operation is continued for a predetermined length of cleaning-liquid supply time (Step S16). A decrease in the supply flow rate of the matrix solution normally indicates that a lump of crystal of the matrix substance is formed at the tip portion of the nozzle 30 and is gradually causing the clogging. The cleaning liquid ejected from the cleaning-liquid ejection nozzle 41 hits this lump of crystal. Thus, the lump of crystal is dissolved and removed.

After discontinuing the supply of the cleaning liquid, the control unit 70 opens both the first pressurizing valve 61b and the spraying valve 61c to spray the matrix solution from the spray unit 3 (Step S17). Subsequently, the control unit 70 refers to the value detected by the flow sensor 66 and determines whether or not the supply flow rate has been recovered (Step S18). A recovery of the supply flow rate means that the lump of matrix crystal has been dissolved, and the nozzle 30 has been unclogged. In that case, the spraying of the matrix solution is fully resumed (Step S19), and the control returns to Step S11. If it is determined in Step S18 that the supply flow rate has not been recovered yet, the control returns to Step S15 to once more discontinue the spraying of the matrix solution and perform the cleaning by the ejection of the cleaning liquid.

Thus, the matrix spray device according to this modified example performs the cleaning of the nozzle 30 when the nozzle 30 has been clogged or is most likely to be clogged, rather than regularly cleaning the nozzle 30. Therefore, the cleaning of the nozzle 30 can be assuredly performed before the nozzle 30 is completely or severely clogged, even in a situation in which the nozzle 30 is considerably liable to be clogged, such as the case where a matrix that is prone to cause clogging is used, or the case where the concentration of the matrix is high, or the case where the opening area of the opening 321 of the solution tube 32 is decreased (e.g. by increasing the diameter of the needle 31) in order to maximally decrease the size of the sprayed droplets.

The matrix spray device according to the previous embodiment or modified example may be configured to perform the cleaning of the nozzle 30 based on an instruction by a user. More specifically, the device may be configured so that a user using the input unit 8 enters an instruction for the cleaning, in response to which the control unit 7 or 70 performs the cleaning of the nozzle 30. The cleaning of the nozzle 30 may be always performed before the initiation of the spraying of the matrix solution and/or at the completion of the spraying operation.

The matrix spray device according to the previous embodiment or modified example can promote the dissolution of the matrix crystal which mainly clogs the opening 321 of the nozzle 30, by supplying a pressurized flow of the matrix solution to the solution tube 32 while discontinuing the supply of the spray gas to the gas tube 33. Accordingly, it is possible to combine the removal of the crystal from outside the nozzle 30 by the ejection of the cleaning liquid from the cleaning-liquid ejection nozzle 41 and the removal of the crystal from inside the nozzle 30 by the pressurized supply of the matrix solution to the solution tube 32. The two combined operations may be simultaneously performed or alternately repeated.

Experimental Example

As one example, an experiment has been conducted to confirm the cleaning effect on the nozzle 30 by the cleaning unit 4 used in the previously described matrix spray device, as will be hereinafter described.

Due to the mechanism of the spraying of the matrix solution in the present device, the matrix solution is always adhered to the tip portion of the needle 31 in the spray unit 3, so that the matrix substance is inevitably deposited on the surface of the needle 31 through the vaporization of the solvent from the solution. The higher the concentration of the matrix substance in the matrix solution is, the more noticeable the aforementioned phenomenon becomes. The degree of the clogging varies depending on the kind of matrix substance. Accordingly, in this experimental example, a high-concentration matrix solution was prepared using 9-Aminoacridine (hereinafter abbreviated as "9-AA"), which is a kind of matrix that is comparatively prone to cause clogging. The solution was sprayed on the tip of the needle 31 to artificially cause deposition of the matrix, and the amount of cleaning liquid required for removing the matrix substance deposited on the tip of the needle 31 was experimentally evaluated.

Experimental Conditions

Matrix: 9-AA (A2905, manufactured by Tokyo Chemical Industry Co., Ltd.)

Matrix solvent: 80% methanol

Concentration of matrix solution: 20 mg/mL

Cleaning liquid: 100% methanol (the same solvent as used for the matrix solution)

Opening area at the tip of the nozzle 30 (tip opening area): 0.012 mm$^2$

Experimental Procedure (1) The matrix solution was sprayed from the nozzle 30 until the nozzle 30 was clogged by the matrix deposited at the tip of the needle 31. The situation that "the nozzle 30 was clogged" is the situation in which the adhesion of a visually recognizable amount of matrix solution no longer occurs on a piece of wiping paper (KimWipes®, manufactured by NIPPON PAPER CRECIA CO., LTD.) placed in the spray flow from the tip of the nozzle 30 for approximately three seconds.

(2) With no spray of the matrix solution from the nozzle 30, the cleaning liquid was ejected until the lump of matrix crystal adhered to the tip portion of the needle 31 was dissolved and became invisible. The period of time required for the lump of crystal to be dissolved (cleaning-liquid supply time) was measured.

(3) The matrix solution was sprayed once more, and the wiping paper was placed in the spray flow to confirm that the nozzle 30 had been unclogged and the matrix solution was being assuredly sprayed.

(4) Steps (1) through (3) were repeated five times.

(5) The amount of cleaning liquid ejected per unit time was measured. Specifically, the cleaning liquid was ejected into a 1-mL Eppendorf tube, and the period of time required for collecting 1 mL of the solution was measured. The average of three such measurements was adopted.

Experimental Result

The period of time required for the matrix substance to be deposited at the tip of the needle 31 and clog the nozzle 30 in Step (1) was approximately 40 seconds. This means that continuing the spraying of the matrix solution for 40 seconds causes the clogging of the nozzle 30 and prevents the spraying from being further continued. The result of the measurement of the cleaning-liquid supply time for the matrix deposited in this manner was as shown in Table 1 below.

TABLE 1

| Sample No. | 1 | 2 | 3 | 4 | 5 | Average |
|---|---|---|---|---|---|---|
| Cleaning-Liquid Supply Time | 5 sec | 4 sec | 5 sec | 4 sec | 4 sec | 4.4 sec |

The average of the cleaning-liquid supply time was 4.4 seconds. It should be noted that the position and direction of the cleaning-liquid ejection nozzle 41 as well as other related parameters were appropriately adjusted for the cleaning operation so that the cleaning liquid would hit the tip portion of the needle 31. The amount of cleaning liquid ejected per unit time was 0.125 mL/sec according to the measurement result. These results demonstrated that a total amount of 0.5 mL to 0.625 mL of the cleaning liquid (methanol) was required in the present experiment to remove the matrix (9-AA) deposited at the tip portion of the needle 31 and once more enable the spraying operation.

Understandably, those are specific results obtained under the previously described experimental conditions by the previously described experimental procedure. The required amount of the cleaning liquid varies depending on various factors, such as the kind of matrix, concentration of the matrix and size of the lump of matrix crystal deposited on the needle 31. Even with those factors considered, it is possible to expect that the lump of matrix crystal adhered to the tip portion of the needle 31 can be removed by supplying the cleaning liquid by a maximum amount of approximately 3 mL, or for a maximum cleaning-liquid supply time of approximately 15 to 20 seconds. A smaller lump of crystal requires a lower amount of cleaning liquid. However, even in that case, it is preferable to continue the supply of the cleaning liquid for approximately one second when the previously described amount of ejection is used. Accordingly, the minimally required amount of cleaning liquid can be estimated to be approximately 0.1 mL.

Further Modified Examples

It is evident that the previously described embodiment and the modified example are mere examples of the present invention, and any further modification, change or addition appropriately made within the spirit of the present invention will fall within the scope of claims of the present application.

For example, the device according to the previous embodiment is configured to supply the solution liquid in the cleaning-liquid container 42 by applying pressure on the liquid surface by the gas supplied from the gas supply source 65. A different method may also be used; for example, the cleaning liquid may be supplied by a syringe pump.

In the previous embodiment, the sample pretreatment device according to the present invention is configured as a device for spraying a matrix substance by a spray method. The present invention is not limited to such a device; for example, it may be applied in a device which sprays a matrix substance by an electrospray deposition (ESD) method. In the ESD method, the ejection of the matrix solution by a flow of gas is performed after the matrix solution in the solution tube is electrically charged by an electric field created by applying a DC voltage to the solution tube. As with the spray method, the ESD method uses a spray nozzle equipped with a solution tube and a gas tube extending parallel to the solution tube with its tip located in the vicinity of the tip of the solution tube. Therefore, the present invention can be similarly applied as in the previously described example.

Furthermore, the sample pretreatment device according to the present invention is not limited to a device which sprays a matrix for MALDI. It can also be used in various other applications in which a reagent or the like used for a pretreatment for an analysis is sprayed. As specific examples, the present invention may be used for the spraying of various derivatization reagents (e.g. fluorescence reagent) or a reagent which produces a biochemical effect (e.g. digestive enzyme).

[Various Modes]

It is evident for a person skilled in the art that the previously described illustrative embodiment is a specific example of the following modes of the present invention.

(Clause 1) One mode of the sample pretreatment device according to the present invention is a sample pretreatment device configured to apply, to the surface of a sample, a solution in which a predetermined substance is dissolved or dispersed, including:

a spray unit including a solution tube for the solution to pass through, a gas tube for a spray gas to pass through, and a nozzle part configured to spray the solution arriving at the terminal end of the solution tube by ejection of the spray gas through the gas tube; and a cleaning liquid supplier configured to put a cleaning liquid on an opening of the nozzle part from outside the spray unit.

As compared to a conventional device, the sample pretreatment device described in Clause 1 can more assuredly and more efficiently remove the lump of crystal formed at the tip of the nozzle part and unclog the nozzle part. In particular, the lump of crystal formed on an area outside the opening of the nozzle part can be efficiently dissolved and removed. This reduces the amount of change in the flow rate of the solution due to the clogging of the nozzle part and thereby allows the solution to be sprayed in a stable form. Consequently, for example, the matrix can be applied with a high degree of uniformity which leads to a high level of analysis reproducibility. Furthermore, since the cleaning liquid is supplied to the tip of the nozzle part via a channel independent of the solution tube, the unclogging of the nozzle part can be achieved with a minimal influence on the spraying operation.

(Clause 2) In the sample pretreatment device described in Clause 1, the spray unit may further include a needle protruding from an opening of the solution tube by a predetermined length, and the cleaning liquid supplier may be configured to put the cleaning liquid on the tip portion of the needle.

In the sample pretreatment device described in Clause 2, the solution which has reached the terminal end of the solution tube flows along the needle to an area outside the opening, and is torn into droplets due to the effect of the spray gas. Accordingly, the size of the droplets of the sprayed solution can be extremely decreased. Furthermore, in the present case, the substance in the solution easily deposits at the tip of the needle and forms a lump of crystal. This lump can be properly dissolved and removed by putting the cleaning liquid on the needle tip.

(Clause 3) The sample pretreatment device described in Clause 1 or 2 may further include a controller configured to control a spraying operation by the spray unit and an operation of supplying the cleaning liquid by the cleaning liquid supplier, so as to perform a discharge of the cleaning liquid from the cleaning liquid supplier every time the spraying of the solution by the spray unit is performed for a predetermined period of time.

In the sample pretreatment device described in Clause 3, the predetermined period of time can be appropriately determined so as to remove the crystal by the cleaning liquid and impede the occurrence of the clogging before the nozzle is clogged by the crystal of the substance in the solution.

(Clause 4) The sample pretreatment device described in Clause 1 or 2 may further include:

a detector configured to detect the flow rate of the solution supplied to the solution tube; and a controller configured to control a discharge of the cleaning liquid from the cleaning liquid supplier according to a detection result obtained by the detector.

An occurrence of the clogging in the nozzle unit decreases the flow rate of the solution supplied to the solution tube. Accordingly, in the sample pretreatment device described in Clause 4, when it is determined that a decrease in the flow rate of the solution has occurred based on the detection result obtained by the detector, the controller controls the cleaning liquid supplier so as to discharge the cleaning liquid from the cleaning liquid supplier and put the liquid on the tip of the nozzle part. Thus, in the sample pretreatment device described in Clause 4, when the clogging of the nozzle part by a crystal of the substance in the solution has occurred, the device can remove the crystal by the cleaning liquid and reduce the occurrence of the clogging. The device can also prevent the cleaning operation from being unnecessarily performed when there is no clogging of the nozzle part.

(Clause 5) In the sample pretreatment device described in one of Clauses 1-4, the amount of the cleaning liquid supplied for cleaning the nozzle part one time by the cleaning-liquid supplier may be within a range from 0.1 to 3 mL.

The amount of cleaning liquid required for removing a lump of the crystal of the substance in the solution formed at the tip of the nozzle part varies depending on various factors, such as the size of the lump of crystal, state of adhesion, kind of substance and kind of cleaning liquid. In the case of the previously described type of device which sprays a commonly used matrix solution, it is normally the case that the lump of matrix crystal can be sufficiently dissolved and removed when the amount of cleaning liquid supplied for the cleaning one time is approximately within a range from 0.1 to 3 mL.

(Clause 6) In the sample pretreatment device described in one of Clauses 1-5, the solution may be a matrix solution for matrix assisted laser desorption/ionization mass spectrometry, and the cleaning liquid may be the solvent used for the cleaning liquid.

The sample pretreatment device described in Clause 6 can uniformly apply the matrix solution over the entire surface of the sample and enable satisfactory ionization at any position on the sample.

REFERENCE SIGNS LIST

1 . . . Chamber
11 . . . Exhaust Opening
20 . . . XY-Moving Mechanism
21 . . . Sample Stage
3 . . . Spray Unit
30 . . . Nozzle
31 . . . Needle
32 . . . Solution Tube
321 . . . Opening
33 . . . Gas Tube
34 . . . Cover
341 . . . Spray Port
4 . . . Cleaning Unit
41 . . . Cleaning-Liquid Ejection Nozzle
42 . . . Cleaning Liquid Container
43 . . . Cleaning-Liquid Supply Tube
44 . . . Second Pressurizing-Gas Pipe
45 . . . Manual Pressure Control Valve
50 . . . Solution Container
51 . . . Solution Supply Tube
52 . . . Resistance Tube
53 . . . First Pressurizing-Gas Pipe
54, 56, 58, 62 . . . Pressure Control Valve
55 . . . Spraying-Gas Pipe
57 . . . Replacing-Gas Pipe
59, 63 . . . Flowmeter
60 . . . Pressure Gauge
61 . . . Manifold
61a . . . Gas-Replacing Valve
61b . . . First Pressurizing Valve
61c . . . Spraying Valve
61d . . . Second Pressurizing Valve
64 . . . Common Pipe
65 . . . Gas Supply Source
66 . . . Flow Sensor
7, 70 . . . Control Unit
8 . . . Input Unit
100 . . . Sample

The invention claimed is:

1. A sample pretreatment device configured to apply, to a surface of a sample, a solution in which a predetermined substance is dissolved or dispersed, comprising:
   a spray unit including a solution tube for the solution to pass through, a gas tube for a spray gas to pass through, and a nozzle part configured to spray the solution arriving at a terminal end of the solution tube by ejection of the spray gas through the gas tube; and
   a cleaning liquid supplier configured to put a cleaning liquid on an opening of the nozzle part from outside the spray unit.

2. The sample pretreatment device according to claim 1, wherein the spray unit further includes a needle protruding from an opening of the solution tube by a predetermined length, and the cleaning liquid supplier is configured to put the cleaning liquid on a tip portion of the needle.

3. The sample pretreatment device according to claim 2, further comprising a controller configured to control a spraying operation by the spray unit and an operation of supplying the cleaning liquid by the cleaning liquid supplier, so as to perform a discharge of the cleaning liquid from the cleaning liquid supplier every time the spraying of the solution by the spray unit is performed for a predetermined period of time.

4. The sample pretreatment device according to claim 2, further comprising:
   a detector configured to detect a flow rate of the solution supplied to the solution tube; and
   a controller configured to control a discharge of the cleaning liquid from the cleaning liquid supplier according to a detection result obtained by the detector.

5. The sample pretreatment device according to claim 2, wherein an amount of the cleaning liquid supplied for cleaning the nozzle part one time by the cleaning-liquid supplier is within a range from 0.1 to 3 mL.

6. The sample pretreatment device according to claim 5, wherein the solution is a matrix solution for matrix assisted laser desorption/ionization mass spectrometry, and the cleaning liquid is a solvent used for the cleaning liquid.

7. The sample pretreatment device according to claim 1, further comprising a controller configured to control a spraying operation by the spray unit and an operation of supplying the cleaning liquid by the cleaning liquid supplier, so as to perform a discharge of the cleaning liquid from the cleaning liquid supplier every time the spraying of the solution by the spray unit is performed for a predetermined period of time.

8. The sample pretreatment device according to claim 1, further comprising:
   a detector configured to detect a flow rate of the solution supplied to the solution tube; and
   a controller configured to control a discharge of the cleaning liquid from the cleaning liquid supplier according to a detection result obtained by the detector.

9. The sample pretreatment device according to claim 1, wherein an amount of the cleaning liquid supplied for cleaning the nozzle part one time by the cleaning-liquid supplier is within a range from 0.1 to 3 mL.

10. The sample pretreatment device according to claim 9, wherein the solution is a matrix solution for matrix assisted laser desorption/ionization mass spectrometry, and the cleaning liquid is a solvent used for the cleaning liquid.

11. The sample pretreatment device according to claim 1, wherein the solution is a matrix solution for matrix assisted laser desorption/ionization mass spectrometry, and the cleaning liquid is a solvent used for the cleaning liquid.

\* \* \* \* \*